United States Patent [19]

Wells

[11] 4,015,900
[45] Apr. 5, 1977

[54] MICROFICHE READER

[75] Inventor: Thomas R. Wells, Des Plaines, Ill.

[73] Assignee: Bell & Howell Company, Chicago, Ill.

[22] Filed: Dec. 16, 1974

[21] Appl. No.: 532,803

[52] U.S. Cl. .............................. 353/27 R; 353/116
[51] Int. Cl.² .................. G03B 23/08; G03B 23/14
[58] Field of Search ........................ 353/25–26 R, 353/26 A, 27 R, 27 A, 112, 116, 113, 118, 114

[56] References Cited

UNITED STATES PATENTS

| 3,072,013 | 1/1963 | Pratt | 353/27 R |
| 3,528,735 | 9/1970 | Bluitt | 353/27 |
| 3,720,464 | 3/1973 | Ditscheid | 353/27 |
| 3,733,121 | 5/1973 | Smitzer | 353/27 |
| 3,743,400 | 7/1973 | Haning | 353/26 A |
| 3,782,816 | 1/1974 | Costanza | 353/112 |
| 3,836,242 | 9/1974 | Kluver | 353/27 |
| 3,885,867 | 5/1975 | Nelson et al. | 353/27 |

OTHER PUBLICATIONS

Guide to Microfilm Readers . . . , Nov. 5, 1973, pp. 41,42.

Primary Examiner—Harry N. Haroian
Attorney, Agent, or Firm—Robert A. Walsh

[57] ABSTRACT

A microfiche carrier has mechanically interlocking features which makes it possible to store a library file of microfiche in a cartridge so that it is not necessary to manually manipulate the individual microfiche. The reader automatically extracts a selected microfiche from a cartridge and then returns it to the vacated cartridge location. The interlocks prevent movement of the reader parts in a sequence which would damage the microfiche while they are out of the cartridge.

18 Claims, 16 Drawing Figures

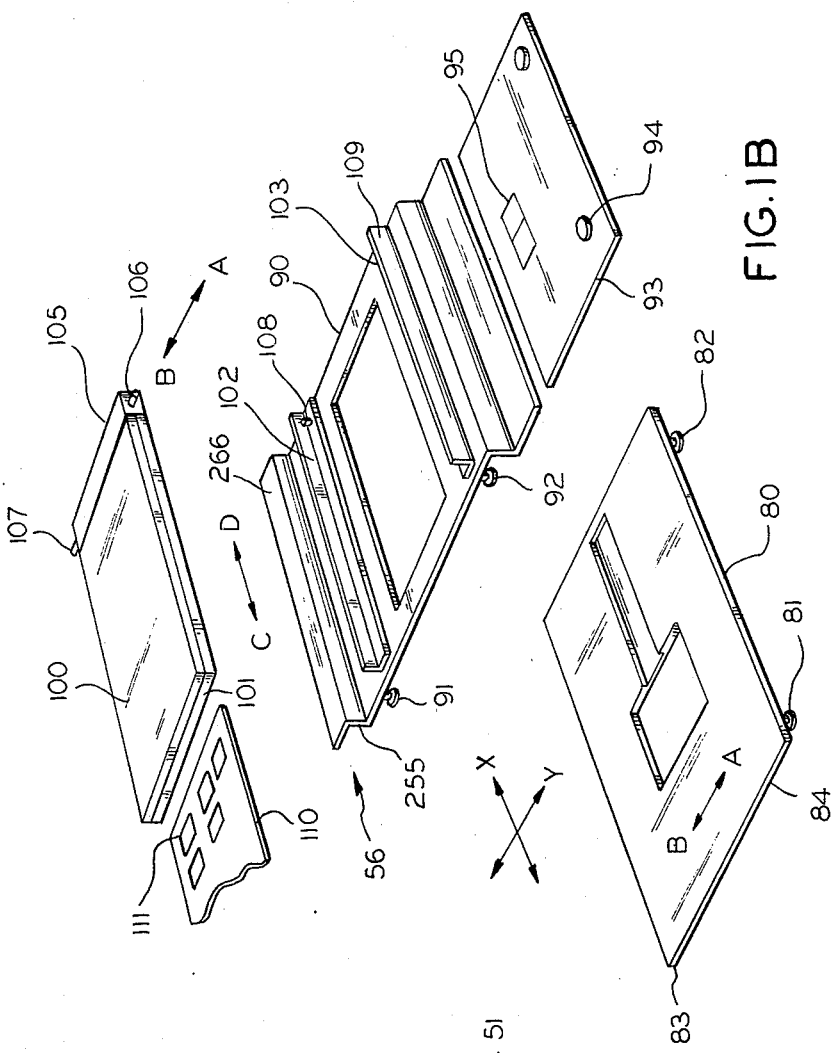
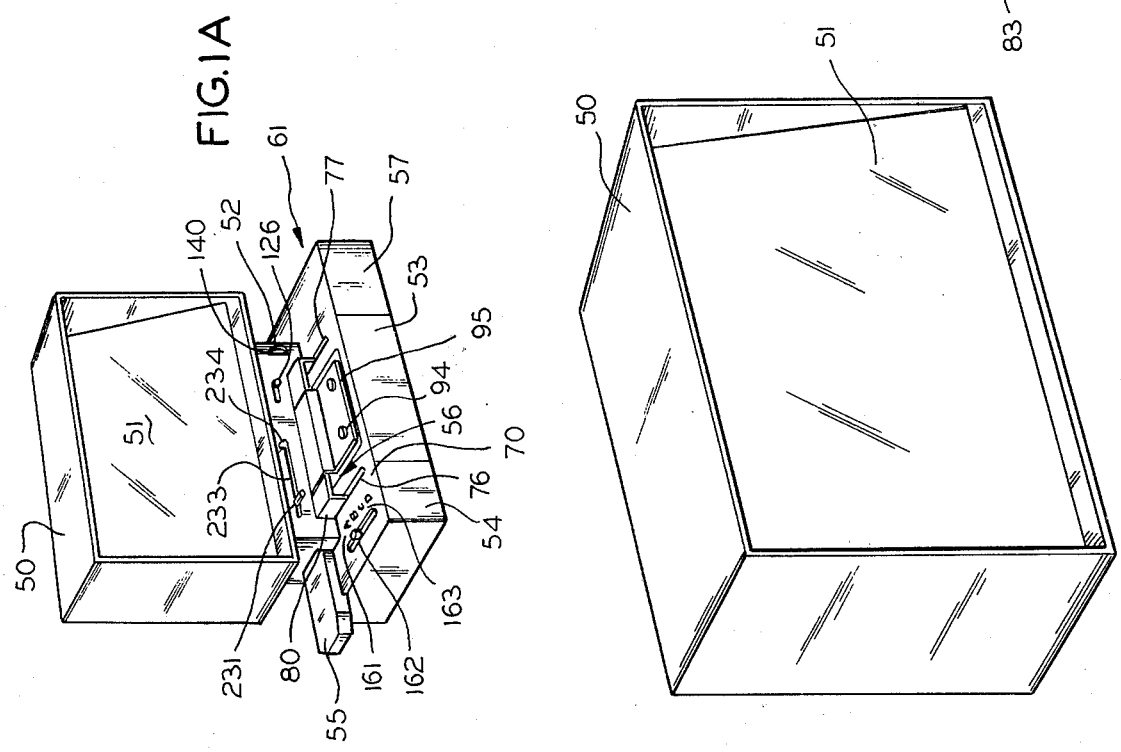
FIG.1A
FIG.1B

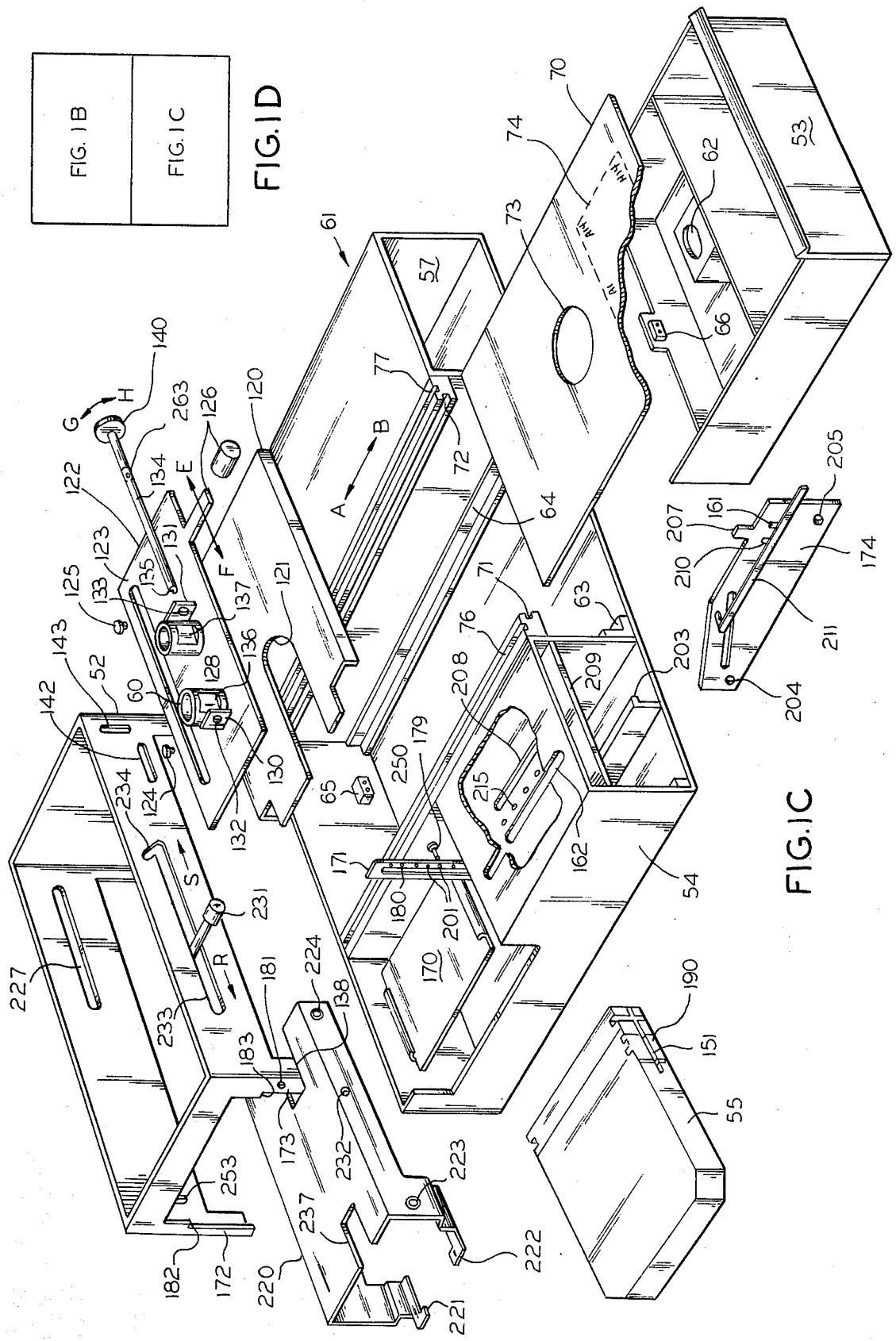

MICROFICHE READER

This invention relates to microfiche readers and more particularly to readers for automatically selecting and projecting images photocopied on microfiche, especially—although not exclusively—preloaded or preloadable in cartridges which may simply be inserted into the reader.

Microfiche film is a known form of graphic data presentation wherein a number of pages are photographically reproduced on a single "card" of microfiche film (such as a card of 3 × 5 inches to 4 × 6 inches, for example). Any suitable number (up to, say, a thousand or so) of pages may be photographically formed in an orthogonal array on a single microfiche card of photographic film. The microfiche film may then be placed in an optical reader and moved with a rectilinear motion until an image of a selected page is positioned in an optical projection path leading to a display screen.

It would be uneconomical to have a microfiche reader system for a single microfiche card; therefore, the user is likely to have an entire library file including many microfiche which must be kept in a specific order for quick recall. Therefore, it should be apparent that use of microfiche involves filing and storing in a library file, removal and mechanical manipulation of the microfiche, and then refiling in the library file. Each microfiche must be found in the library file with little or almost no search, and then returned to the same spot in the library file, for future reference.

The mechanical manipulation of a microfiche involves sliding the microfiche into and out of the library file. Then, it must be placed in a carrier in the reader. Next, the carrier must be moved in X and Y directions, over a rectilinear path until the selected image in the orthogonal array is positioned in the optical path of a projector. Thereafter, the microfiche is removed from the reader and returned to the library file.

Human efforts lead to further problems. If manually kept, the microfiche library file is thumbed and soon becomes dog eared. Any grease on the fingers clouds the film and reduces the quality of the reproduced image. Human error may lead to misfiling and an effective loss of the microfiche. The manipulation of the microfiche within the reader could cause scratches on the film.

To avoid these and other problems, it is possible to keep the microfiche library file in cartridges to that only the cartridges need be touched by the human operator. The mechanical microfiche reader equipment may be designed to manipulate the cartridge, to find and extract the desired microfiche and, after use, to return it to its proper library file location within the cartridge without damage. There should be means for safely retaining the entire library file during storage, without danger of any individual microfiche falling from the cartridge.

An object of the invention is to provide new and improved microfiche readers using cartridges for storing library files. Here, an object is to provide suitable interlocks so that the individual microfiche cannot be lost or damaged. In greater detail, an object is to enable microfiche to be loaded into many cartridges which may then be selected and inserted into the microfiche reader.

A further object is to provide a number of mechanical interlocks which prevent the reader from being operated incorrectly or misused to damage or lose a microfiche. Accordingly, an object of the invention is to provide a simple and obvious form of operation which may be used by people who have no special training in the use of a microfiche reader. Here an object is to enable, say a casual patron of a public library, for example, to use the reader after having received only the simplest form of instructions.

A particular object is to provide a microfiche reader where even simple maintenance may be performed by persons having little or no training.

In keeping with an aspect of the invention, these and other objects are accomplished by providing a microfiche reader having a number of mechanically interacting parts. A cartridge containing a library file may be inserted into an elevator of the reader which is then operated until a selected microfiche is brought adjacent an extractor mechanism. The extractor withdraws the microfiche from the cartridge and passes it through the reader and onto a carrier. The carrier moves and a selected image comes into an optical path which projects it onto a screen. Thereafter, the microfiche is returned to the same location in the cartridge from which it was extracted. Suitable mechanically interlocking parts prevent an improper operation which might damage either the microfiche or the reader.

The nature of a preferred embodiment of the invention may be understood best by a study of the attached drawing wherein:

FIG. 1A shows the inventive microfiche reader in perspective;

FIGS. 1B and 1C (when assembled as shown in FIG. 1D) form an exploded view of the inventive reader;

Figure 2:
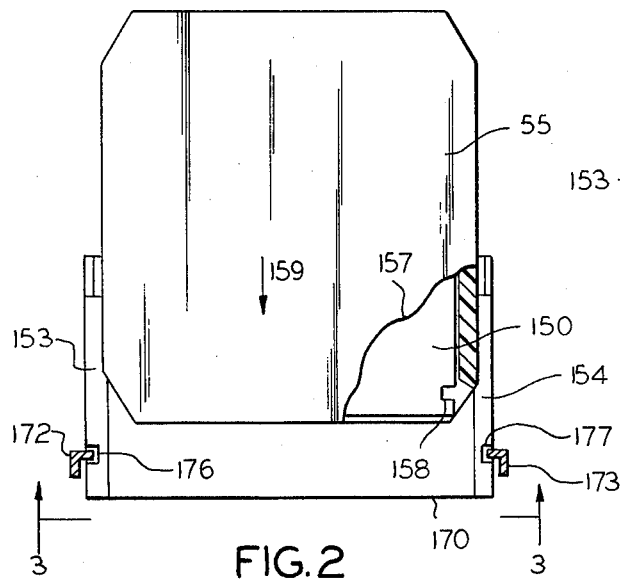
FIG. 2 is a plan view of a microfiche cartridge as it is being inserted into an elevator mechanism built into the reader.

The major assemblies of the inventive microfiche reader (FIG. 1A) are a hood 50, screen 51, housing 52, lamp tray 53, elevator 54, cartridge 55, carrier 56 and convenience tray 57. The hood 50 is a first self-contained unit comprising a hollow box which includes a number of mirrors (not shown) defining a folded optical path by which an image is projected onto a screen 51, such as ground glass or an equivalent plastic material. When an image on a microfiche film is placed under an image forming lens 60 (FIG. 1B), that image is projected over the folded path within the hood and onto the screen 51.

The chassis of the microfiche reader is a second self-contained unit which comprises a base 61 having the housing 52 superimposed thereon. The method of completing the base to housing attachment is irrelevant, the housing could be welded to the base unit. The base unit 61 includes a sliding tray 53 having condenser lens 62 positioned to direct the light of a bulb (not shown) into the optical path. Tray 53 glides on tracks 63, 64 formed in the base 61. A connector 65 in the base mates with a corresponding connector 66 in the tray 53. Thus, to change a light bulb, replace a condenser lens, or the like, it is only necessary to remove one tray 53 and to replace it with another tray. This is important because modern bulbs tend to break if handled owing to a deposit of minute amounts of the salt normally found on all human fingers. Accordingly, one person may be trained to use special tools to replace a bulb, but the casual operator does not have to touch it. He only has to replace a tray.

The tray 53 is covered by a plate 70 which slides into tracks 71, 72 superimposed above the tray. A hole 73 is formed in the plate 70 to enable passage of a light beam from the condenser lens 62 to the image forming lens 60. On the plate 70 is printed or otherwise formed a grid 74 which identifies the individual microfiche images by letter and number. For example, as here shown, the image on the upper left hand corner of a microfiche may have the address A1, the one on the upper right the address A14, and the one on the lower right the address H14. Likewise, every other microfiche image has a similar address. If the plate 70 is removed and inverted or replaced, the addresses of any of many different sizes of microfiche images may be provided.

The cartridge 55 forms bulk storage means for storing a library file of microfiche, in a selected order. As will become more apparent, the reader comprises means for feeding any microfiche selected from the library file into a reading position between glass plates 100, 101 of a microfiche transport system 56, and then returning it to the same position in the file. Since these glass plates 100, 101 may also be opened while the microfiche is therein, it is possible to insert a new microfiche or remove an old microfiche from bulk storage. It is also possible to clean and replace any of the microfiche which are in bulk storage.

Carrier means are provided for extracting and manipulating a microfiche from the library file packed into the cartridge. This carrier is supported on a pair of spaced, parallel guide rails 76, 77 extending transversely across the top of the base unit. A rectangular lower carrier 80 has four wheels (two of which are numbered 81, 82—FIG. 1B) which roll in the tracks 76, 77. Hence, lower carrier 80 may be pushed back and forth in directions A and B. Mounted on track 83, 84, which are perpendicular to tracks 76, 77, is an upper carrier 90 having four wheels, two of which are numbered 91, 92, which ride on tracks 83, 84. Hence, upper carrier 90 may move back and forth in directions C, D. Accordingly, it should be apparent that the upper carrier may be rectilinearly moved in X and Y directions to almost any spot, which is within the tracks 76, 77, 83, 84.

Attached to the front of upper carrier 90 is a transparent plastic plate 93 carrying one or more knobs 94 for moving the carriers 80, 90. Crosshairs or other optical aids 95 engraved on the plastic plate 93 may be positioned over any address on scale 74 in order to locate a microfiche image under the image lens 60.

A pair of spaced parallel glass plates 100, 101 are mounted on the upper carrier 90. In greater detail, lower plate 101 lies on carrier 90 in the space between parallel side rails 102, 103. Upper plate 100 is cemented or otherwise attached to a hinge member 105 having opposed pins 106, 107 which rest in bearings 108, 109 formed in the side rails. Hence, to manually load, replace or clean a microfiche, upper glass plate 100 may be lifted and a microfiche 110 may be placed between it and the lower glass plate 101. It should not be apparent how the microfiche image 111 is placed under the image lens 60 when knob 94 is moved to place the crosshairs 95 over the address A14, for example. Likewise, any other microfiche image may also be placed under the image lens in a similar manner.

Mounted, in any suitable manner, inside housing 52, and over hole 73 and condenser lens 62 is an image lens support plate 120. A cutout 121 enables passage of the light from condenser lens 62 through plate 120 and to the image lens 60. Over the support plate 120 is a lens selecting plate 122 having a slot 123 therein. A pair of screws 124, 125 fit through slot 123 and into threaded holes (not shown) in the plate 120. Thus, a lever and knob 126 may be slid in directions E, F to selectively slide plate 122 over plate 120 and thereby selectively place one of the image lens 60 or 128 in the optical path. One lens may project one size microfiche image and the other a different size microfiche image, for example.

Integrally mounted on each lens mount is a bracket 130, 131 having aligned bearings 132, 133 for receiving a focusing rod 134. An L-shaped groove 135 is formed in the rod 134 to fit into windows 136, 137 in the lens mounts and bear against a lens fitted therein. A thumb wheel 140 may be rotated in directions G, H to turn the rod 134 and thereby lift or lower the lens. If the rotary motion is in direction H, the L-groove 135 lifts the lens 60, 123 in mounts 136, 137. Likewise, motion in direction G causes L-groove 135 to lower the lens in the mounts 136, 137. As the lenses raise or lower, the image is focused on the screen 51. Lever and knob 126 fit through slot 142 and thumb wheel 140 fits through slot 143 in housing 52.

Figure 3:
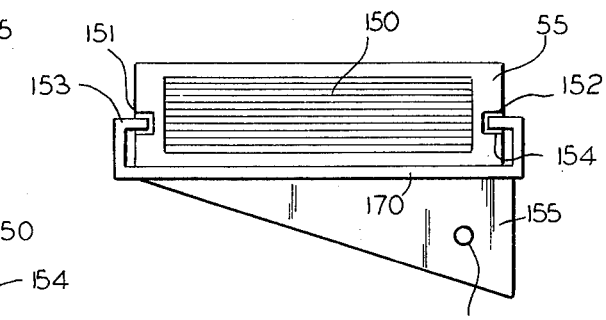
FIG. 3 is a front elevation view taken along line 3—3 of FIG. 2.

According to the invention, an elevator 54 is provided for raising a cartridge to a discrete level for thereby selecting a particular microfiche from a library file. In greater detail, a number of microfiche film 150 (FIG. 3) cartridge packed in a spaced parallel relationship inside a cartridge. Shelves (not shown) are formed inside the cartridge to hold the microfiche in their respective discrete places. It is irrelevant how the microfiche are put into the cartridge. They may be inserted by the user, either by hand or by placing a microfiche film between plates 100, 101 and then allowing the reader to insert it automatically into the cartridge.

The outside vertical cartridge walls have grooves 151, 152 formed in opposite sides to receive tabs 153, 154 formed on an elevator base plate mechanism 155. As seen in FIG. 2, the cartridge 55 is being slid into place between the tabs 153, 154 on the elevator base plate. When the cartridge is snuggly in place, it fits against the front of the elevator base plate 155. The top of the cartridge is broken away at 157 (FIG. 2 and in FIG. 6) to reveal the upper most microfiche in the library file. A pair of notches 158, 158 (FIG. 6) are formed on each of the opposing front corners of each of the microfiche so that extractor hooks may enter the front of the cartridge, ride up or down through the vertically aligned microfiche notches 158, 158 and stop adjacent a selected one of the microfiche. Then, the extractor hook is withdrawn in direction 159 to thereby pull the microfiche at the selected cartridge height from the library file inside the cartridge.

Means in the form of the elevator of FIGS. 2–6 are provided to raise or lower the cartridge by a precisely selected distance, to thereby position the extractor hooks adjacent the selected microfiche. The elevator motion is controlled by a lever arm tab 161 which slides in a slot 162 on the top of the microfiche reader housing. Alpha-numerical characters are printed on base unit 61 adjacent the lever tab 161 to identify the height of the elevator and, therefore, the microfiche selected from cartridge 55.

The elevator mechanism comprises the elevator base plate 170 (FIG. 1C), an elevator shaft 171, a pair of oppositely disposed guides 172, 173 and a control plate 174. The elevator base plate 170 includes a pair of opposed slots 176, 177 (FIG. 2) which receive the edges of guides 172, 173. The elevator shaft 171 includes an elongated slot 180 which fits behind the edge guide 173. A screw 179 fits through the slot 180 in the shaft and turns into hole 181 in edge guide 173 and the bottom of the shaft 171 is attached to a member 155 which is vertically dependent from the elevator base plate 170 (FIG. 3), thereby vertically stabilizing the shaft. Accordingly, the elevator base plate 170 can slide up and down on the edge guides 172, 173 without binding.

Figure 4:
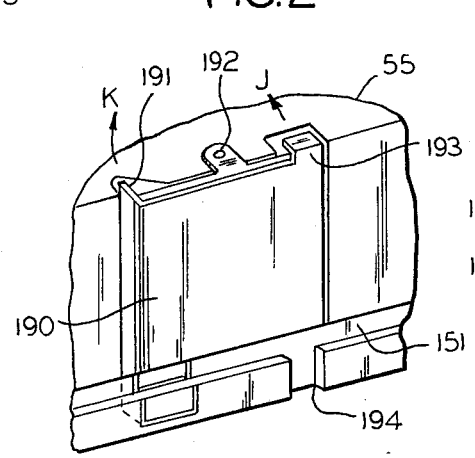
FIG. 4 is a perspective view of a corner of the cartridge showing a locking mechanism for holding a library file of microfiche film in the cartridge until it is locked in place within the reader and is ready for an extraction of a microfiche film.

FIG. 4 explains the first interlock mechanism whereby the microfiche are locked into the cartridge while the cartridge is out of the reading position. In greater detail, a plate 190 having a detent 191, is pivotally mounted at 192 and at an oppositely disposed pivot point on the bottom of the cartridge. A spring (not shown) biases the plate 190 in direction K, whereby detent 191 enters the cartrige to fit into a notch in the microfiche and prevent their removal from the cartridge. To manually load and unload the cartridge, a tab 193 integrally formed on plate 190 is pressed in direction J. Plate 190 then pivots to move detent 191 out of the cartridge and out of the notch in the microfiche. Microfiche may be inserted into or removed from the cartridge 55. Then, the tab 193 is released. Responsive to a spring bias, plate 190 pivots on point 192, detent 191 re-enters the cartridge, and the microfiche are again locked into the cartridge.

Means are provided for interlocking the cartridge into the reader to preclude its removal while a microfiche is removed therefrom. The microfiche are also locked in the cartridge so that they cannot be inadvertently removed therefrom except when the cartridge is locked in the reader. More particularly, as the elevator base plate 170 slides up the edge guides 172, 173, it engages the shoulders 182, 183 which control the interlock for the microfiche in cartridge 55. The vertical space below shoulders 182, 183 provides a clearance for the insertion of a cartridge 55 into the elevator mechanism.

As the elevator 55 raises, the edge guides 172, 173 (FIG. 5) slide in slots 176, 177 without contacting the cartridge 55 until shoulders 182, 183 enter slots 194 (FIG. 4) on the cartridge. The elevator continues rising after it reaches the shoulders 182, 183. As the shoulder 183 passes over plate 190, it pivots in direction J to lift the detent 191 out of the cartridge and out of the notches in the microfiche. The microfiche may now be extracted from the cartridge, but the cartridge cannot be removed from the reader owing to interference of the edge guides above shoulders 182, 183 in slots 194 of the cartridge. This interference occurs when the cartridge 55 is moved upward to correspond to microfiche position No. 1, as well as all other corresponding positions.

The elevating control mechanism comprises a vertically oriented plate 174 (FIG. 5) having an inclined slot 200 formed therein. Dependent from and integral with the elevator base plate 170 is the vertical plate 155 having a pin 202 fixed perpendicularly thereto. The pin 202 rides in slot 200. Therefore, as plate 174 moves back and forth in directions L, M, the pin 202 slides along the inclined slot 200 to move the elevator up and down in directions N, P (e.g., dotted lines in FIG. 5 show how the inclined slot has moved to position 200a to thereby lower the pin to the position 202a).

Figure 5:
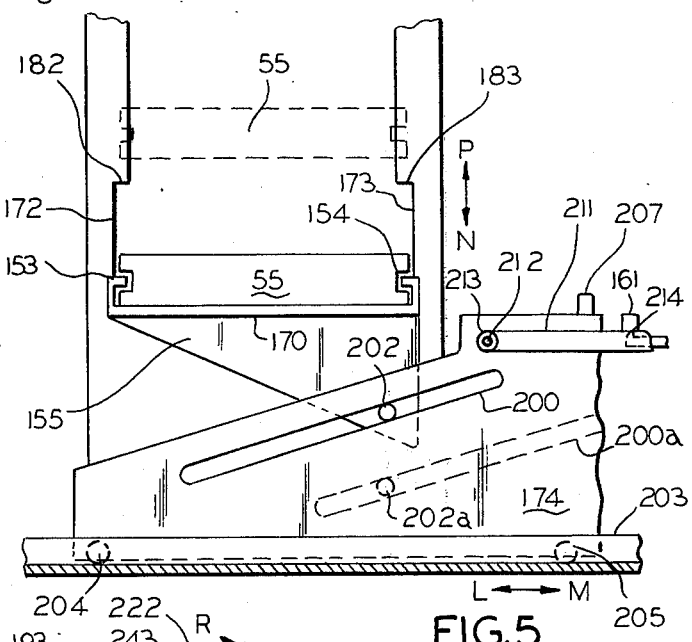
FIG. 5 is a schematic front view (similar to FIG. 3) of an elevator mechanism for selectively raising the cartridge to a microfiche selecting position.

The plate 174 has lower edge wheels 204, 205, which ride on a rail 203 (FIGS. 1, 5). Integrally formed on plate 174 is an upper tab 207 which fits into a slot 208 on a plate 209 (FIG. 1) in base unit 61. A control lever 211 having tab 161 is pivotally attached at 212 to plate 174. A clock spring 213 (FIG. 5) urges the lever to a raised position. In such a position, the tab 161 projects upwardly through the slot 162 in the top of the base 61. A detent 214 is integrally formed on the lever 211 having tab 161. Detent 214 fits into any one of many holes 215 longitudinally disposed in plate 209 along a path parallel to the slot 162. Thus, the lever arm tab 161 may be pushed downwardly against the bias of clock spring 213, and slid in directions L, M to a selected spot which is identified by the alpha-numerical scale 163 (FIG. 1A), representing an index of the microfiche contained in cartridge 55. Then, the tab 161 is released, and spring 213 forces detent 214 into the adjoining hole 215. The mechanical dimensions are such that a selected microfiche, identified by the alpha-numerical scale 163 is opposite an extractor arm whenever detent 214 is in a hole 215 identifying that microfiche. This way, any microfiche in the library file may be selected and extracted from the cartridge.

Figure 8:
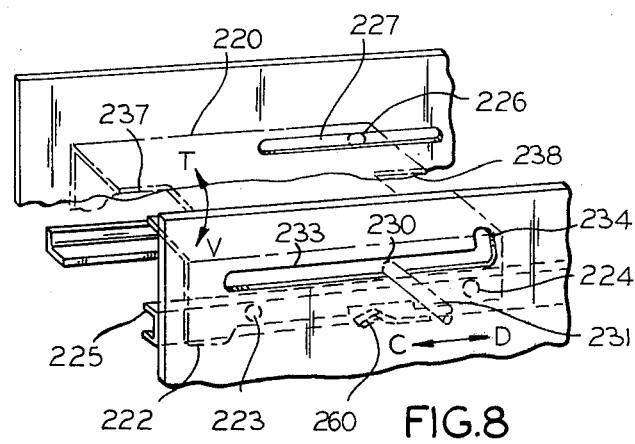
FIG. 8 is a perspective view of an extractor mechanism.
Figure 9:
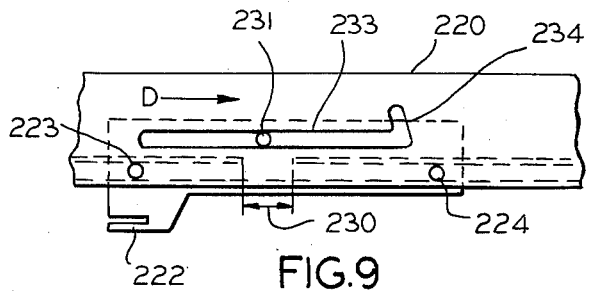
FIG. 9 is a first stop motion, schematic view of the extractor mechanism shortly after the start of the microfiche extraction process.

Means are provided for extracting the selected microfiche 150 from the cartridge 55. In greater detail, an extractor plate 220 (FIGS. 1C, 8, 9, 10) has a generally box shape with extractor hooks 221, 222 dependent from the leading corners thereof. (The term "leading" means the end of the extractor plate which enters the cartridge.) The bottom of the extractor plate 220 has a pair of wheels 223, 224 which ride in directions C and D along a U-shaped channel 225 on the inside front of housing 52 (FIG. 8). A third wheel 226 on the back of the extractor plate rides in a slot 227 on the back of the housing 52. A flange on wheel 226 enables extractor plate 220 to be tipped in directions T, V without pulling the wheel 226 from the slot 227. A notch 230 is cut out of the top of the U-shaped rail 225 so that wheel 223 may be lifted out of the track when the extractor plate tips up in direction T, as will be explained.

Lever 231 is fixed in a hole 232 on the extractor plate 220 and fits through a slot 233 on the housing 52. Therefore, it should now be apparent that the extractor plate 220 rolls back and forth in directions C, D and tips up and down in directions T, V under the control of the sliding file extraction lever 231 as it is manually moved along slot 233. The tipping motion is controlled when lever 231 slides up and down in the off vertical slot 234.

The top of the extractor plate 220 is cut out at 237 so that the microfiche image may be projected upwardly there through from the image lens. The cut out at 238 enables a removal of the lens for maintenance, repair, or replacement.

Figure 6:
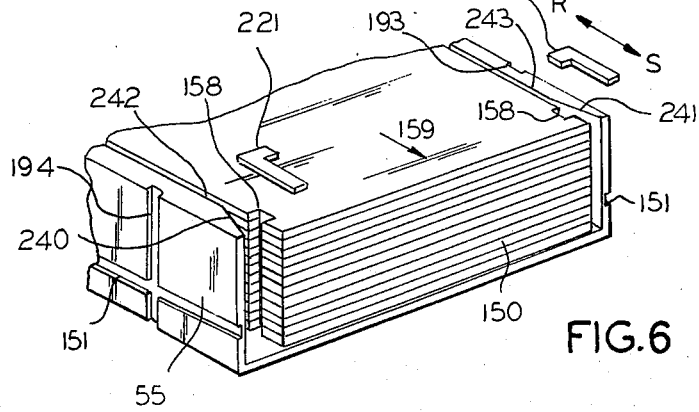
FIG. 6 is a schematic view, in perspective, of an end of the cartridge positioned adjacent an extractor mechanism.

The microfiche extraction operation should be most apparent from an inspection of FIG. 6. In greater detail, the sliding extraction lever 231 is moved in direction C (FIG. 8) to the end of slot 233. This places the extractor hooks 221, 222 in a position which is over the vertical notches 158, 158 in the microfiche. The cartridge 55 is then slipped into the elevator. Tapered internal front walls 240, 241 (FIG. 6) of the cartridge cooperate with the tapered corners 242, 243 on the front of the microfiche in order to guide and direct the cartridge to a position where the notches 158, 158 are directly under the extractor hooks 222, 223.

As the elevator raises or lowers, the notches 158 of a selected microfiche 155 comes to rest adjacent the ends of extractor hooks 221, 222. When the sliding extraction lever 231 moves in direction S, the microfiche is pulled out of cartridge 55, with motion in direction 159. When the sliding lever 231 is pulled in direction R, the microfiche is returned into place in the cartridge from which it was extracted. Since the elevator is not able to move while the microfiche is out of the cartridge, it is returned to the exact same place in the cartridge.

Means are provided for preventing an extraction or return of the microfiche unless the elevator cartridge and carrier are properly interlocked. More specifically, the elevator shaft 171 (FIG. 1C) includes a row of holes 250 which mate with a detent (not shown) that can only be unlatched when the extractor plate 220 is in the extract position. Hence, the elevator cannot be raised or lowered after sliding extraction lever 231 is moved any appreciable distance in direction S. This means that, when a microfiche is extracted, the vacated spot in the library file remains properly located for the return and reinsertion of the microfiche.

Means are provided for preventing movement of the carriage 80, 90 during the extraction and reinsertion of the microfiche. More particularly, the back of housing 52 includes two cut outs 253, 254 (FIG. 7) which are part of an interlocking mechanism which must be validly positioned before an extraction or return of a microfiche is possible. Carrier 90 includes a protruding detent 255 which fits into the cut out 253. Therefore, the carrier 50 cannot be moved into a microfiche extraction position unless carrier 90 is first moved all the way in direction C and then carrier 80 is moved all the way in direction B. When in this position, detent 255 enters the cut out 253. When the extractor plate 120 is also moved all the way in direction C, the extractor hooks 221, 222 are resting between the side flanges and in the bottom of the L-shaped rails 102, 103 as hook 221 is shown resting in FIG. 7.

It should now be apparent that detent 255 prevents carrier movement in directions C, D and hooks 221, 222 prevent carrier movement in directions A, B. Therefore, only one path can be followed during the extraction and reinsertion of a microfiche. That path is for the hooks 221, 222 to glide between the L-shaped rails.

Briefly in resume of the operation thus far, a cartridge 55 is inserted onto the elevator base plate 170 and lever tab 161 is pushed down and slid to select an alpha-numerical indication which plates extractor hooks 221, 222 in the notches 158 of a selected microfiche. Next, the sliding extract lever 231 is moved in direction D (FIG. 9) to move extractor plate 220, thereby pulling the selected microfiche from the cartridge. The microfiche 110 (FIG. 1B) slides in between the glass plates 100, 101 of the upper carrier 90. Continued movement of the select lever 231 brings the microfiche 110 to the proper operating position between glass plates 100, 101. At that time it is necessary to remove the extractor hooks 221, 222 from the microfiche notches 158 and to raise the hooks above the L-shaped carrier rails 102, 103 so that rectilinear carriage movement may proceed. More over, it is necessary to back the hooks 221, 222 somewhat in the notches 158 to avoid damaging the microfiche when the hook is lifted.

Figure 7:
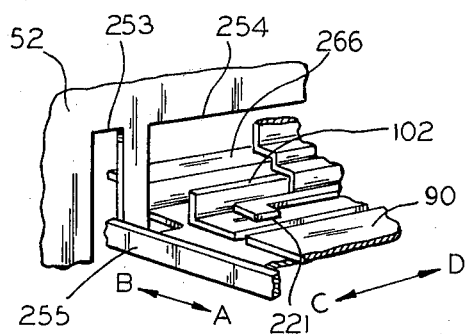
FIG. 7 is a perspective view of a fragment of the extractor mechanism and a mirofiche carrier showing an interlock mechanism for insuring against improper carrier motion while a microfiche is being extracted.

Means are provided for lifting the extractor hooks out of the microfiche notches and for releasing the carrier interlocks illustrated in FIG. 7. In greater detail, it should be noted that the vertical end 234 of slot 233 is inclined somewhat to the left of vertical (as viewed in FIGS. 8-10). This inclination is in the direction C which is opposite to the direction D in which the microfiche travels as it is extracted from the cartridge. Therefore, when lever 231 is lifted into slot 234, the extraction plate is actually pushed back in direction C. This causes hooks 221, 222 to back off from the leading edge of the notch 158 which are engaged during extraction. The inclination of slot 234 is such that the hooks 221, 222 do not move back far enough to touch the trailing edge of the notch 158.

Beneath the cutout 230 in the U-shaped channel 225 is a leaf spring 260 for upwardly urging the extractor plate wheels 223, 224. When wheel 224 rolls over the leaf spring 260, the leaf spring has no effect because lever 231 is then moving in the horizontal slot 233 to restrict any lifting movement. Thus, the wheel 224 rides smoothly past cutout 230 and continues its travel in the U-shaped channel 225.

Figure 10:
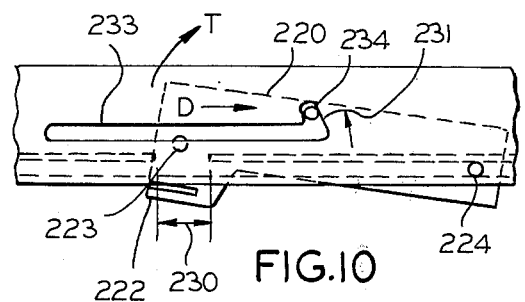
FIG. 10 is a second and similar stop motion, schematic view at the end of the extraction process.
Figure 11:
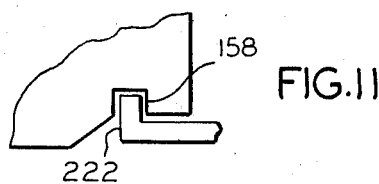
FIG. 11 is a plan view of a fragment of a corner of a microfiche carrier and an extractor hook.
Figure 12:
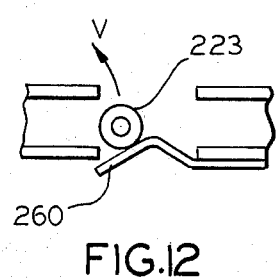
FIG. 12 is a schematic disclosure of how the extractor hook is lifted to the FIG. 10 position without damage to the microfiche.

When the extractor plate 220 reaches the operating position, at the extremity of its excursion in direction D, lever 231 is opposite the vertical slot 234 and wheel 223 is opposite cutout 230. The light spring 260 tends to form an inclined plate as shown in FIG. 12, with a resulting wheel 223 motion in direction V. This means that the hooks 221, 222 will be backed slightly and also lifted in direction V, thereby clearing notches 158 in the microfiche without touching them. As a result, the extraction plate 220 is tipped, as shown in FIG. 10, thereby raising the hooks 221, 222, out of the L-shaped carrier rails 102, 103 and releasing one of the carrier interlocks, seen in FIG. 7. The carrier may now be pulled in direction A and then direction D, whereupon the microfiche may be moved freely to any location so tht cross hairs 95 may be placed over any image locator index at 74 (FIG. 1C).

An additional interlock feature of the present invention prevents movement of extractor plate 220, and lever 231, when carriage 80, 90 is anywhere but in the load position, shown in FIG. 7. As extractor plate 220 moves upward, as shown in FIG. 10, to lift hooks 221, 222 from L-shaped carrier rails 102, 103, carrier 80, 90 is free to move to any location. When so moved, the top of the plate 266 on the rear of upper carrier 90, as well as the edges of the plate 266, interfer with hooks 221, 222 and prevent the downward movement of the hooks and extractor plate 220. Slide lever remains locked upward in slot 234, and the extractor cannot move. Thus, once a microfiche 110 has been located in the carrier 80, 90, and the carrier moved away from the load position, the above described interlock prevents another fiche from being extracted from the cartridge 55. Conversely, each fiche must be replaced in the same location in the cartridge from which it was extracted, due to an interlock or elevator mechanism 171 (FIG. 1C), and a second fiche cannot be removed until the previous fiche has been reinserted in the cartridge. It is apparent that this interlock system insures the integrity of the library file and prevents inadvertent operation.

Means are provided for insuring a proper focus. Briefly, all mechanical parts are certain to have manufacturing tolerances. The looser the tolerances, the lower the cost. Therefore, it is desirable for the image lenses in mounts 60, 128 to have a focal length which is independent of these tolerances. A moments reflection makes it clear that the image lens mounts should ride freely upon the top of glass plate 100. The sides of the glass are exactly parallel. The thickness of the glass is precisely dimensioned. The microfiche 110 (FIG. 1C) is held firmly against the underside of the cover glass plate 100. Hence, the image lens and the microfiche always have the same spacial relationship if the lens mount 60 merely glides across the floats on the top of the cover glass.

Figure 13:
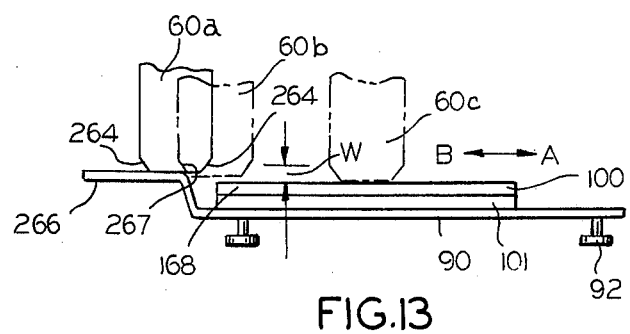
FIG. 13 is a schematic diagram showing how image forming lens holders slide over the upper surface of a microfiche cover glass on the carrier, without chipping the edge of the cover glass.

For the foregoing reasons, the lens mounts sit loosely in sockets on plate 122 (FIG. 1C). Focusing rod 134 is supported by bearings 132, 133 integrally attached to the loose lens mounts 60, 128. A pivot point 263 frees rod 134 from any rigid alignment with housing 52 and allows focusing rod 134 to tip to any position fixed by the bearings 132, 133 (i.e., a position parallel to the surface of the cover glass 100). The bottom 264 (FIG. 13) of the lens mount 60 is rounded or otherwise shaped to enable the lens to glide smoothly over the surface of glass 100.

The problem is that the lens mount 60 must be removed from the top of glass plate 100 when the carrier 90 is pulled forward (direction A) so that the glass plate 100 may be lifted to manually change a microfiche in the carrier. However, if the lens mount floats freely on the cover glass surface, it will tend to ride off and chip the edge of the glass, as it is so removed from and then returned onto the glass 100. Accordingly, a shelf 266 (such as stainless steel) is formed adjacent the edge of the cover glass on the back of the carrier 80 to receive and support the lens mounts 60, 128 when the carrier is moved to its extremity direction A.

More specifically, at the position 60C, the lens mount rests upon and slides over the upper surface of glass plate 100 as it is moved to locate a microfiche image.

As the carrier 90 is pulled in direction A, the lens mount 60 engages the shelf at point 267. There, the edges of the shelf 266 and the lens mount are in the shape of mutually inclined planes. Thus, the lens mount 60 is lifted to the position 60b before it moves off the edge of cover glass 100. Thus, at the point where the edge is likely to chip, the lens mount is raised by a distance so that chipping is not possible.

Finally, the carrier 90 reaches the outward extremity of its movement in direction A and the lens mounts 60, 128 are resting upon the stainless steel shelf 266.

The microfiche carrier glass plate 100 may now be lifted in any suitable manner. The microfiche between plates 100, 101 may be removed, cleaned, replaced or otherwise adjusted. Then, the carrier 90 is pushed back in direction B and the lens mount 60 returns over the path indicated by the three positions 60a, 60b, 60c until they again glide smoothly over the top of the glass sheet 100.

Detent means comprising holes 201 (FIG. 1C) are provided in elevator mechanism 171 to cooperate with a lever (not shown) activated by movement of upper carrier 90 into and out of the load position shown in FIG. 7. The lever is connected to elevator base plate 170, and prevents the elevator mechanism from raising or lowering unless the carriers 80, 90 are in the load position. This interlock structure insures that any microfiche film 110 extracted from cartridge 55 is returned to the same place in the library file from which it was removed.

Those who are skilled in the art will readily perceive how various modifications may be made within the scope and the spirit of the invention. Therefore, the appended claims are to be construed to cover all equivalent structures.

I claim:

1. A microfiche reading system of a type which uses a cartridge containing a library file of microfiche film stored in a spaced parallel relationship, carrier means for receiving a selected film from said file and for transporting said film with a rectilinear motion through said reader, extraction means for removing said selected film from said cartridge, for inserting it into said carrier, and for thereafter returning it from said carrier to said cartridge, and interlocking means for precluding movement of said cartridge at all times while a microfiche film is out of the cartridge and for precluding a sequence of mechanical movements of said reader parts which might damage the film while it is out of said cartridge.

2. The system of claim 1 wherein said carrier means comprises means for enabling movement of said carrier while containing said film when said interlock means is locked, said last named means comprising upper and lower carriers, at least one track on said reader for enabling movement of said lower carrier back and forth in a first direction of rectilinear motion, and at least one track on a vertical edge of said lower carrier for enabling movement of said upper carrier back and forth in the other direction of said rectilinear motion.

3. The system of claim 2 and a pair of glass plates in face-to-face relationship on said upper carrier, and means whereby said extraction means inserts and removes selected microfiche film between said glass plates.

4. The system of claim 3 and lens means for projecting an image appearing on a selected microfiche film via said projection path, image lens mounting means floating freely over and fully supported on the surface of one of said glass plates for fixing the spacial relationship between said image lens and said microfiche films, and means for selectively removing said image lens mounting means from floating on said cover glass when carriers are at an extremity of said rectilinear motion.

5. The system of claim 1 and elevator means for selectively moving said cartridge transversely by and adjacent to said extraction means, said elevator comprising means for longitudinally moving a first plate having freedom to move in a first direction, an inclined slot formed in said first plate, an elevator base plate having freedom to move in a second direction perpendicular to said first direction, pin means dimensioned to move in said slot for joining said base plate to said inclined slot whereby said elevator base plate moves perpendicular to said first plate responsive to the movement in said first direction, indicator means for identifying a selected microfiche in terms of the extent of the plate movement in said first direction, and means responsive to movement of said carrier means for operating said interlock to preclude movement of said elevator while said microfiche film is out of said reader.

6. The system of claim 1 wherein each microfiche film has two opposed notches formed on opposite sides thereof for enabling an extraction of said film from said cartridge, said extraction means comprises a pair of hooks fitting into the two opposed notches on said film, and means for moving said hooks over a disengaging path in which said hooks are backed and then lifted out of said notches without damaging said film.

7. A microfiche reading system of a type which uses a cartridge containing a library film microfiche film stored in a spaced parallel relationship, carrier means for receiving a selected film from said file and for transporting said film with a rectilinear motion through said reader, said carrier means comprising upper and lower carriers, at least one track on said reader for enabling movement of said lower carrier back and forth in a first direction of said rectilinear motion, and at least one track on a vertical edge of said lower carrier for enabling movement of said upper carrier back and forth in the other direction of said rectilinear motion, each of said upper and lower carrier means including detent and capture means which must be locked or unlocked in a predetermined order while said microfiche is being removed from or returned to said cartridge, extraction means for removing said selected film from said cartridge, for inserting it into said carrier, and for thereafter returning it from said carrier to said cartridge, and interlocking means for precluding movement of said reader parts in a sequence which might damage the film while it is out of said cartridge.

8. A microfiche reading system of a type which uses a cartridge containing a library file of microfiche film stored in a spaced parallel relationship, each microfiche film having a notch formed therein for enabling an extraction of said film from said cartridge, carrier means for receiving a selected film from said file and for transporting said film with a rectilinear motion through said reader, extraction means for removing said selected film from said cartridge, for inserting it into said carrier, and for thereafter returning it from said carrier to said cartridge, said extraction means comprising a hook fitting into the notch of said film, means for moving said hook over a disengaging path in which said hook is backed and then lifted out of said notch without damaging said film, said hook moving means comprising a plate having at least one wheel mounted on a track for moving said plate back and forth in a film extraction motion, said moving means further comprising means responsive to a movement of said wheel through a cutout in said track for tipping said extractor plate to back and lift said hook out of said notch, and interlocking means for precluding movement of said reader parts in a sequence which might damage the film while it is out of said cartridge.

9. A microfiche reader comprising cartridge means containing a library file of microfiche film stored inside said cartridge in a spaced parallel relationship, means for transporting a film selected from said file through said reader, including a pair of glass plates, said transport means including locking means which requires a locking or unlocking sequence performed in a predetermined order, said predetermined order precluding movement of said cartridge at all times except when all microfiche are firmly fitted in a fully seated position within said cartridge, means for transferring said selected film from said cartridge to said transporting means and between said glass plates and thereafter for transferring said film from said transporting means back into said cartridge, means for operating said transporting means to position a selected image on said selected microfiche in an optic path in said reader, lens mounting means freely gliding over and fully supported by the surface of one of said glass plates, and means for lifting said lens mounting means from said glass surface when said transport means reaches an extremity of its motion.

10. A microfiche reading system of a type which uses a cartridge containing a library file of microfiche film stored in a spaced parallel relationship, carrier means for receiving a selected film from said file and for transporting said film with a rectilinear motion through said reader, carrier means comprising upper and lower carriers, at least one track on said reader for enabling movement of said lower carrier back and forth in a first direction of said rectilinear motion, and at least one track on a vertical edge of said lower carrier for enabling movement of said upper carrier back and forth in the other direction of said rectilinear motion, extraction means for removing said selected film from said cartridge, for inserting it into said carrier, and for thereafter returning it from said carrier to said cartridge, interlocking means for precluding movement of said reader parts in a sequence which might damage the film while it is out of said cartridge, housing means for said reader, latch means on said upper carrier means, and slot means in said housing for mating with said latch means and restraining said upper carrier against lateral movement when said upper and lower carrier are in position for receiving a film from said cartridge.

11. A microfiche reading system of a type which uses a cartridge containing a library file of microfiche film stored in a spaced parallel relationship, notch means in each of said microfiche films, carrier means for receiving a selected film from said file and for transporting said film with a rectilinear motion through said reader, said carrier means comprising upper and lower carriers, at least one track on said reader for enabling movement of said lower carrier back and forth in a first direction of said rectilinear motion and at least one track on a vertical edge of said lower carrier for enabling movement of said upper carrier back and forth in the other direction of said rectilinear motion, extraction means for mechanically engaging the notch in a selected one of said microfiche carrier and withdrawing it from or returning it to said cartridge, a pair of opposed rail means extending laterally across said upper carrier defining a channel therebetween, said extraction means being disposed in said channel when moving to mechanically engage and extract said microfiche, said extraction means preventing forward movement of said upper carrier when disposed in said channel, and interlocking means for precluding movement of said reader parts in a sequence which might damage the film while it is out of said cartridge.

12. The microfiche reader system of claim 11 including:
   housing means for said reader;
   latch means on said upper carrier means;
   slot means in said housing for mating with said latch means and restraining said upper carrier against lateral movement when said upper and lower carrier are in position for receiving a film from said cartridge.

13. The microfiche reader system of claim 11 including:
   means to remove said extraction means from said channel when said extraction means has completed withdrawing a microfiche film from said cartridge and placing said film into said upper carrier, whereby said upper carrier is no longer restrained against forward movement.

14. The microfiche reader system of claim 13 including:
   plate means forming part of said upper carrier and extending therefrom;
   said plate means engaging a portion of said extraction means when said upper carrier is moved through said rectilinear motion and preventing said extraction means from moving into position to withdraw additional microfiche.

15. The microfiche reader system of claim 14 wherein:
   said means to remove said extraction means from said channel tilts said extraction means vertically upward, and
   said plate means prevents downward vertical movement of said extraction means when said upper carrier is moved through said rectilinear motion.

16. The microfiche reader system of claim 12 including:
   elevator means for moving said cartridge in a vertical direction with said extraction means passing through said notch means;
   detent means connected between said elevator means and said housing and actuated by the position of said upper carrier for preventing movement of said elevator means when said upper carrier is moved through said rectilinear motion.

17. A microfiche cartridge reader system comprising at least one longitudinally elongated guide means and a clearance space adjacent one end thereof, microfiche cartridge means having at least one longitudinal groove on the outer surface thereof for receiving said guide means, said clearance space and cartridge having mutually complimentary contours whereby said cartridge may be inserted into said clearance space and then moved longitudinally with said guide means fitting into said groove, whereby said cartridge cannot be removed from said reader until it is moved back to said clearance space, other guide means perpendicular to said one guide means, and other contours on said cartridge whereby said cartridge may be moved over said perpendicular guide means at the end of said longitudinal movement.

18. The system of claim 17 wherein said clearance space is formed by notching out a section of said guide means, a shoulder formed on said guide means, said shoulder entering said groove responsive to said longitudinal movement for locking said cartridge into said reader.

* * * * *